United States Patent [19]
Yoder, Jr.

[11] Patent Number: 5,667,329
[45] Date of Patent: Sep. 16, 1997

[54] QUICK CHANGE PVC PIPE CONNECTION SYSTEM

[76] Inventor: James Herbert Yoder, Jr., 1111 Daniels Rd., Lincolnton, N.C. 28092

[21] Appl. No.: 654,084

[22] Filed: May 28, 1996

[51] Int. Cl.⁶ .................. A47C 4/32; F16B 12/20; F16B 21/12
[52] U.S. Cl. .................. 403/327; 403/326; 403/34; 403/19; 285/317; 285/319
[58] Field of Search .................. 403/109, 327, 403/326, 34, 36, 19

[56] References Cited

U.S. PATENT DOCUMENTS

| | | | |
|---|---|---|---|
| 2,229,475 | 1/1941 | Redmer | 403/109 X |
| 3,456,662 | 7/1969 | Weber | 403/109 X |
| 4,247,216 | 1/1981 | Pansini | 403/109 |
| 4,679,261 | 7/1987 | Stanley et al. | 403/109 X |
| 4,757,778 | 7/1988 | Scaglia | 403/109 X |
| 4,830,035 | 5/1989 | Liu | 403/327 X |
| 5,352,057 | 10/1994 | Zody | 403/109 |

*Primary Examiner*—Anthony Knight
*Attorney, Agent, or Firm*—Michael I. Kroll

[57] ABSTRACT

A quick change PVC pipe connection system (10) comprises a pipe (12) having a pair of opposite spaced apertures (14) extending through one end (16). A fitting (18) has a flange (20) with a pair of opposite spaced orifices (22) extending through the flange (20). A pair of pins (24) are provided. A facility (26) within the pipe (12) is for forcing each pin (24) through one aperture (14) in the pipe (12) and into one orifice (22) in the flange (20) of the fitting (18), when the end (16) of the pipe (12) is inserted into the flange (20) of the fitting (18), so as to retain the pipe (12) to the fitting (18).

17 Claims, 3 Drawing Sheets

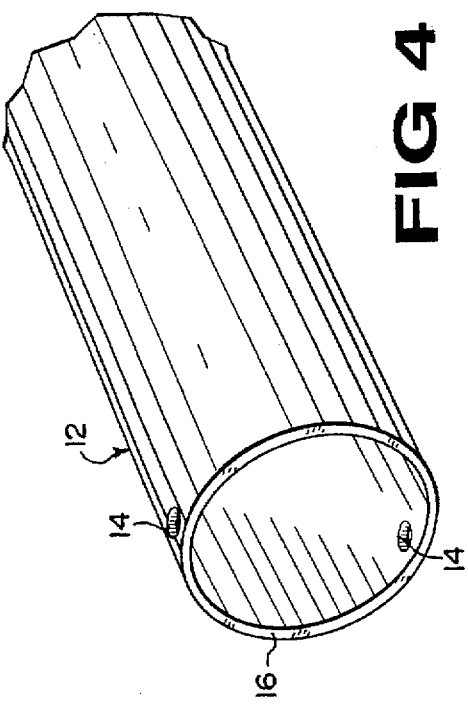
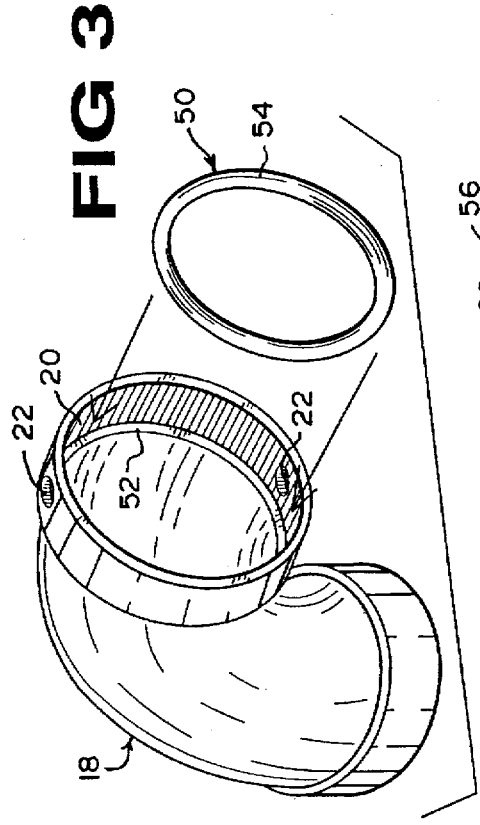
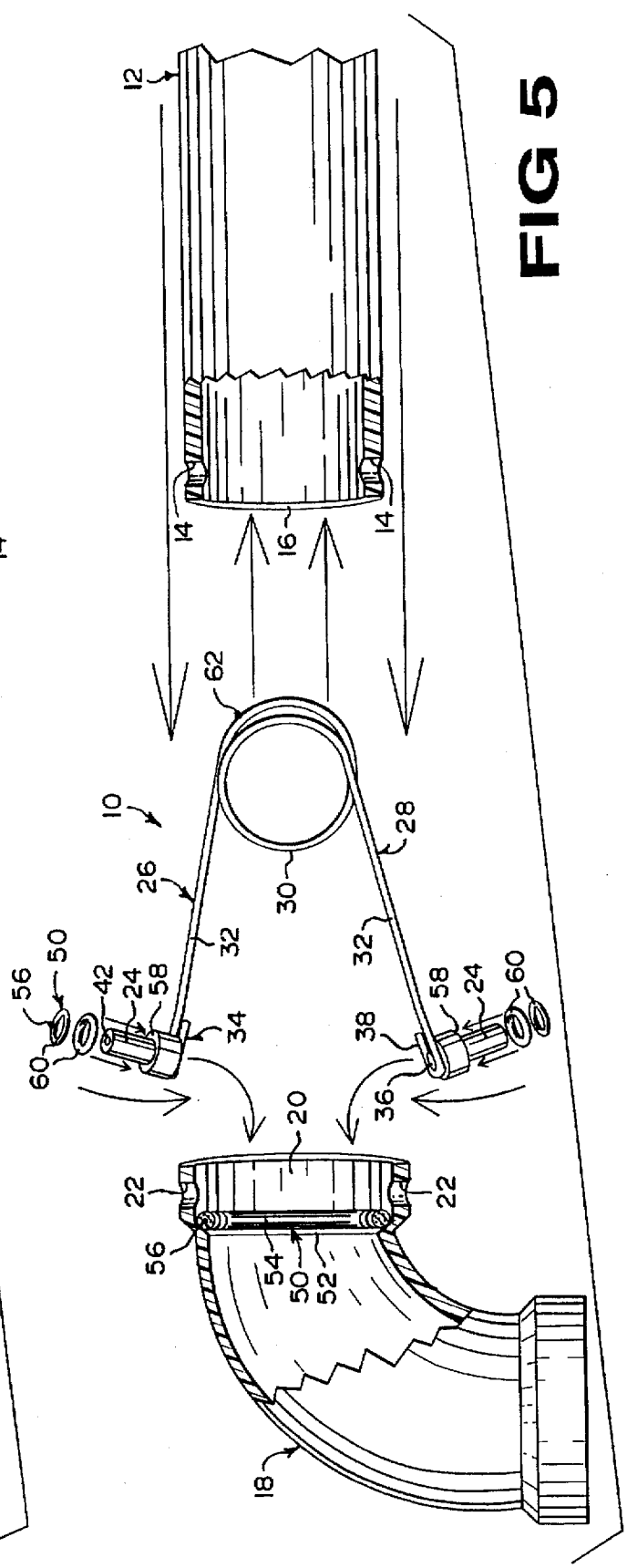

QUICK CHANGE PVC PIPE CONNECTION SYSTEM

BACKGROUND OF THE INVENTION

1. Field of the Invention

The instant invention relates generally to fasteners and more specifically it relates to a quick change PVC pipe connection system.

2. Description of the Prior Art

Numerous fasteners have been provided in prior art that are adapted to attach or join various items securely together, such as by pinning, tying or nailing. While these units may be suitable for the particular purpose to which they address, they would not be as suitable for the purposes of the present invention as heretofore described.

SUMMARY OF THE INVENTION

A primary object of the present invention is to provide a quick change PVC pipe connection system that will overcome the shortcomings of the prior art devices.

Another object is to provide a quick change PVC pipe connection system that can take frameworks or plumbing pipes and assemble them quickly with spring pin connectors without using glue, screws or bolts.

An additional object is to provide a quick change PVC pipe connection system that can take the frameworks or plumbing pipes and disassemble them quickly with a special tool by disengaging the spring pin connectors with the special tool.

A further object is to provide a quick change PVC pipe connection system that is simple and easy to use.

A still further object is to provide a quick change PVC pipe connection system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3 is a perspective view of the elbow fitting shown in FIG. 2, with the O-ring gasket exploded therefrom.

FIG. 4 is a perspective view of the pipe shown in FIG. 2.

FIG. 5 is an exploded side view taken in the direction of arrow 5 in FIG. 2, with parts broken away and in section.

Similar reference characters denote corresponding features consistently throughout the attached drawings.

DETAILED DESCRIPTION OF THE PREFERRED EMBODIMENTS

Figure 1:
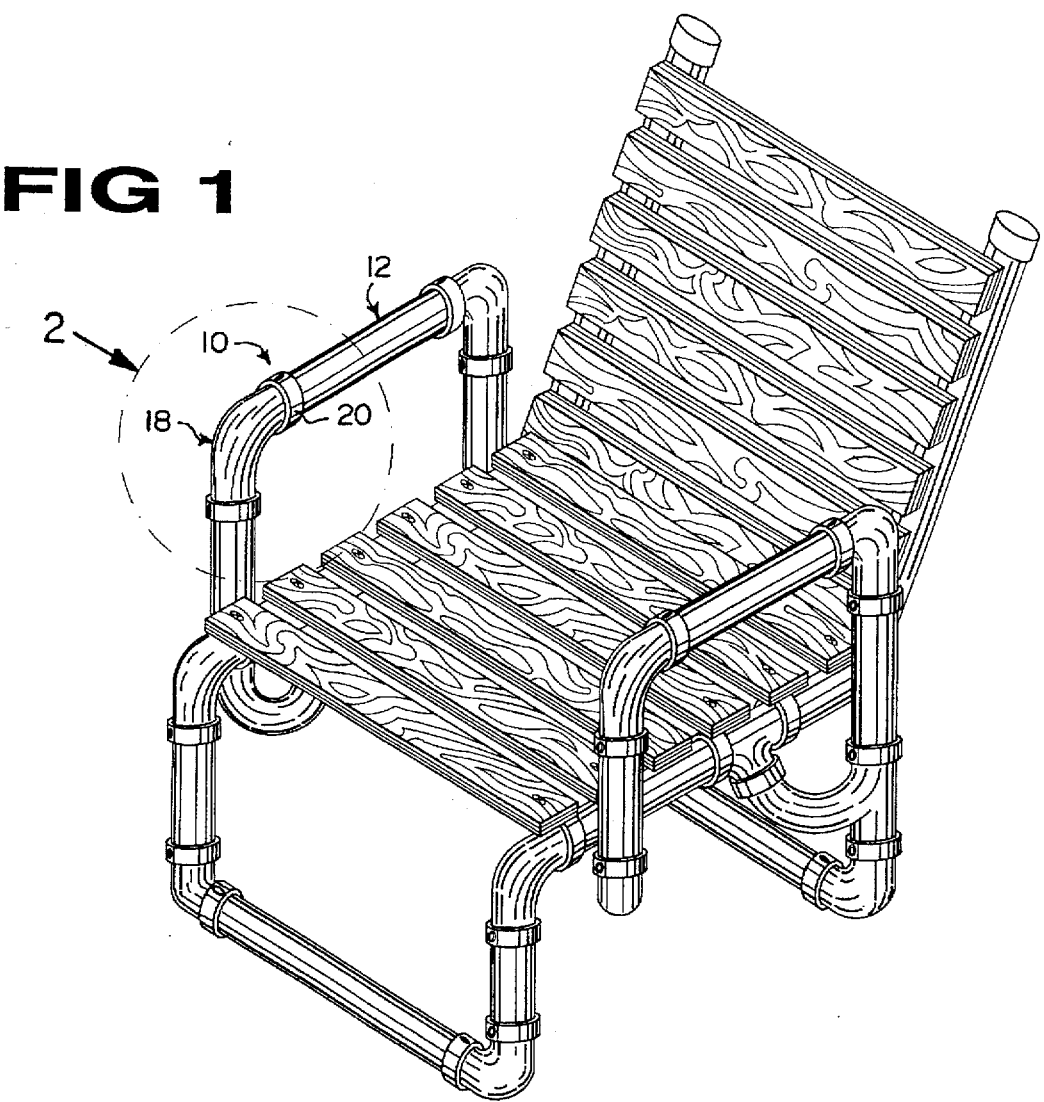
FIG. 1 is a perspective view of an outdoor lawn chair with the instant invention installed within the framework.
Figure 2:
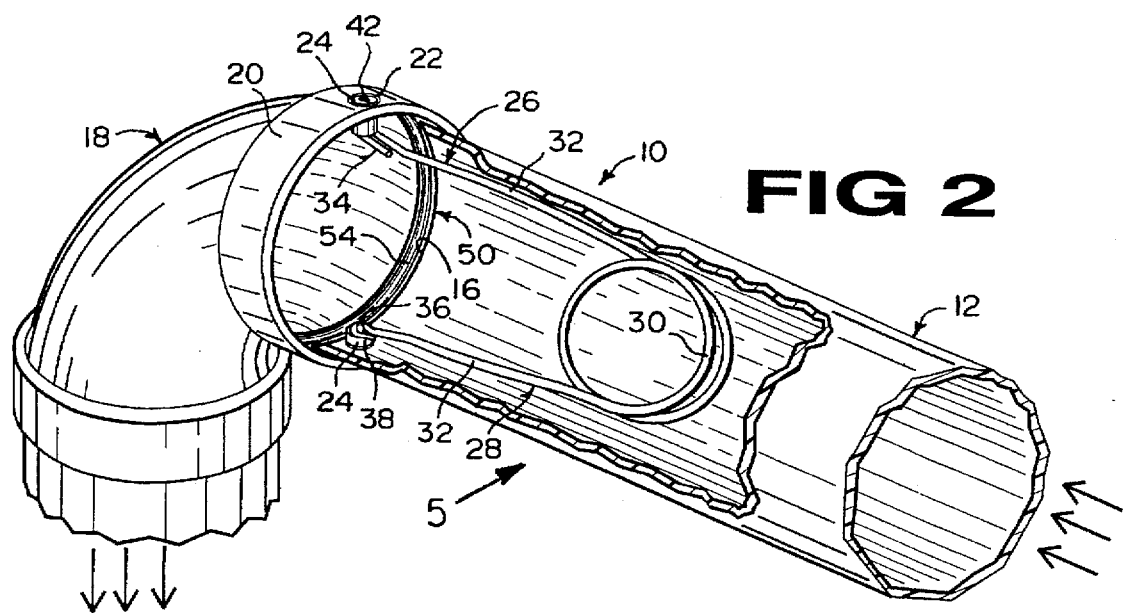
FIG. 2 is an enlarged perspective view of the area indicated by arrow 2 in FIG. 1, with parts broken away and in section, showing the instant invention in greater detail.

Turning now descriptively to the drawings, in which similar reference characters denote similar elements throughout the several views, FIGS. 1 through 8 illustrate a quick change PVC pipe connection system 10 comprising a pipe 12 having a pair of opposite spaced apertures 14 extending through one end 16. A fitting 18 has a flange 20 with a pair of opposite spaced orifices 22 extending through the flange 20.

A pair of pins 24 are provided. A facility 26 within the pipe 12 is for forcing each pin 24 through one aperture 14 in the pipe 12 and into one orifice 22 in the flange 20 of the fitting 18, when the end 16 of the pipe 12 is inserted into the flange 20 of the fitting 18, so as to retain the pipe 12 to the fitting 18.

The forcing facility 26 is a torsion wire spring 28. The torsion wire spring 28 includes a coiled portion 30 and a pair of arms 32. Each arm 32 extends from one side of the coiled portion 30. An assemblage 34 is for connecting a distal free end of each arm 32 to one pin 34.

Each connecting assemblage 34 consists of a rivet 36 extending from a bottom end of the pin 24. The arm 32 has a loop 38 formed on the distal free end, whereby the loop 38 extends about the rivet 36 to hold the pin 24 thereto.

Figure 6:
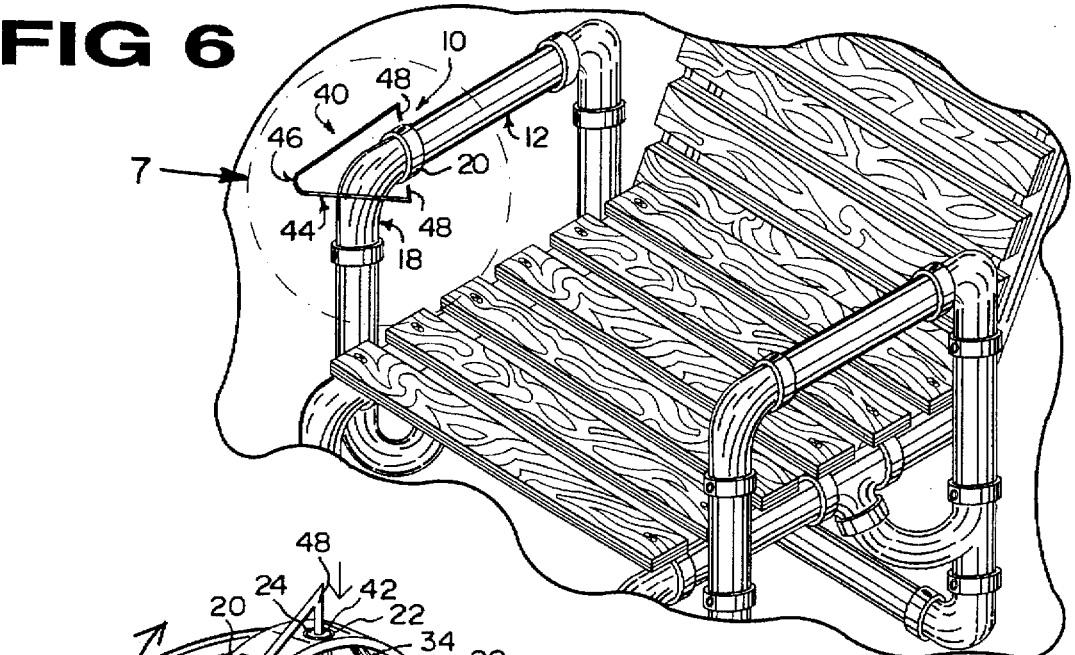
FIG. 6 is a perspective view similar to a portion of FIG. 1, showing a special tool ready to engage with the instant invention for disassembling the framework.
Figure 7:
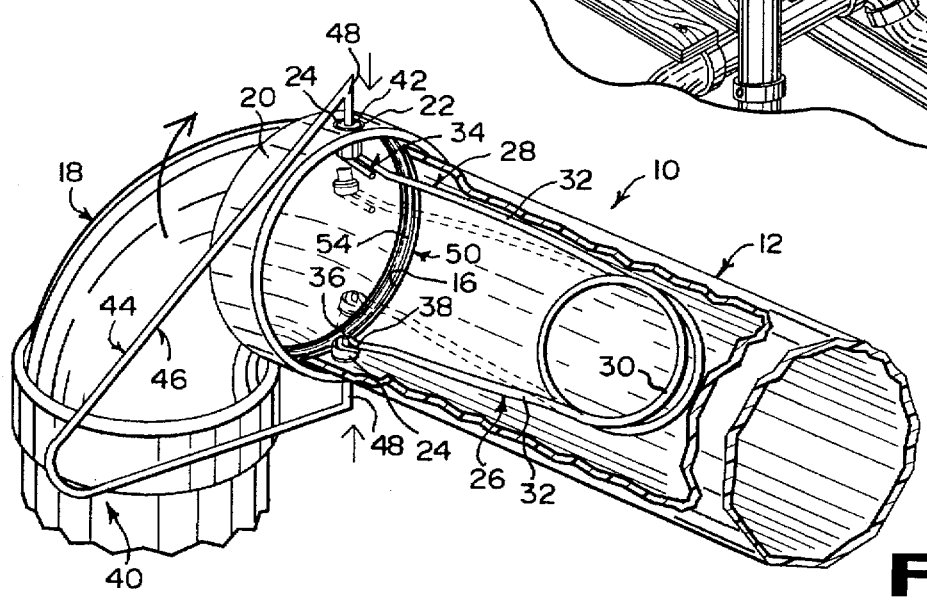
FIG. 7 is an enlarged perspective view of the area indicated by arrow 7 in FIG. 6 with parts broken away and in section, showing the special tool engaging with the instant invention in greater detail.
Figure 8:
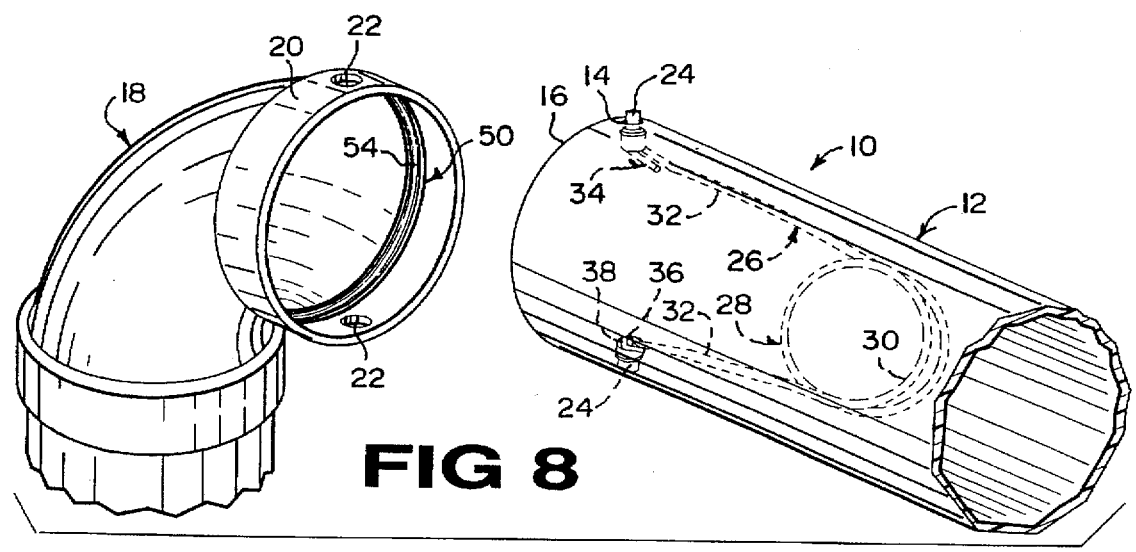
FIG. 8 is a enlarged perspective view similar to FIG. 7, with the special tool eliminated therefrom and the pipe with the instant invention separated from the elbow fitting.

A structure 40, as shown in FIGS. 6 and 7, is for releasing both of the pins 24 from the orifices 22 in the flange 20 of the fitting 18, so that the end 16 of the pipe 12 can be removed from the flange 20 of the fitting 18. The releasing structure 40 comprises each of the pins 24 having a top hole 42 therein. A disassembly tool 44 being a generally V-shaped heavy duty flexible wire 46 has right angle bent ends 48. When the tool 44 is squeezed, the bent ends 48 can engage with the top holes 42 in the pins 24, to push the pins 24 out of the orifices 22 in the flange 20 of the fitting 18.

Paraphernalia 50 is for sealing the connecting between the pipe 12 and the fitting 18, so that a fluid can pass between the pipe 12 and the fitting 18 without a leakage therefrom. The sealing paraphernalia 50, as best seen in FIG. 3, includes the fitting 18 having an annular groove 52 formed within the flange 20.

An O-ring gasket 54 is sized to fit tightly between the annular groove 52 in the flange 20 of the fitting 18 and the end 16 of the pipe 12, to prevent leakage therefrom. The O-ring gasket 54 is fabricated out of a durable rubber material 56.

The sealing paraphernalia 50, as best seen in FIG. 5, also includes each pin 18 having a circular seat 58 formed thereon. A pair of washer gasket 60 are sized to fit tightly onto the pin 18 and up against the aperture 14 in the pipe 12, to prevent leakage therefrom. Each washer gasket 60 is fabricated out of the durable rubber material 56. The torsion wire spring 28 is fabricated out of a stainless steel material 62.

The quick change PVC pipe connection system 10 can be utilized in the framework of a lawn chair, as shown in FIGS.

1 and 6. The quick change PVC pipe connection system 10 can also be utilized in plumbing pipes, as indicated by flow arrows in FIG. 2, when the sealing paraphernalia 50 is installed. Other applications of the invention, not shown in the drawings can also be used, such as the assembly of different sport goals, the framework of other types of lawn furniture, toys and when other PVC tubular construction is needed.

OPERATION OF THE INVENTION

To use the quick change PVC pipe connection system 10, the following steps should be taken:

1. Drill the opposite spaced apertures 14 through the end 16 of the pipe 12 and drill the opposite spaced orifices 22 through the flange 20 of the fitting 18.
2. Make sure that the orifices 22 will align up with the apertures 14, when the end 16 of the pipe 12 is inserted into the flange 20 of the fitting 18.
3. Place the washer gaskets 60 onto the circular seats 58 on the pins 18 and the O-ring gasket 54 in the annular groove 52 in the flange 20 if a leak proof seal is needed.
4. Insert the torsion wire spring 28 into the end 16 of the pipe 12 with coiled portion 30 in first, so that the pins 24 will snap into the apertures 14 in the pipe 12.
5. Place the flange 20 of the fitting 18 over the end 16 of the pipe 12 with the pins 24 slightly depressed into the aperture 14.
6. Rotate the flange 20 of the fitting 18 slightly, so that the orifices 22 will align up with the apertures 14 and the pins 24 will now snap into the orifices 22 in the flange 20, by the force of the torsion wire spring.
7. Position the bent ends 48 of the disassembly tool 44 into the top holes 42 in the pins 24.
8. Squeeze the tool 44, so that the bent end 48 will push the pins 24 out of the orifices 22 in the flange 20 of the fitting 10.
9. Remove the flange 20 of the fitting 18 from the end 16 of the pipe 12.

LIST OF REFERENCE NUMBERS 10 quick change PVC pipe connection system
12 pipe
14 aperture in 12
16 end of 12
18 fitting
20 flange on 18
22 orifice in 20
24 pin
26 forcing facility
28 torsion wire spring for 26
30 coiled portion of 28
32 arm of 28
34 connecting assemblage of 28
36 rivet of 34
38 loop on 32 of 34
40 releasing structure
42 top hole in 24 for 40
44 disassembly tool for 40
46 V-shaped heavy duty flexible wire of 44
48 right angle bent end of 46
50 sealing paraphernalia
52 annular groove in 20 of 50
54 O-ring gasket of 50
56 durable rubber material for 54 and 60
58 circular seat on 18 of 50
60 washer gasket of 50
62 stainless steel material for 28

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A quick change PVC pipe connection system comprising:
   a) a pipe having a pair of opposite spaced apertures extending through one end;
   b) a fitting having a flange with a pair of opposite spaced orifices extending through said flange;
   c) a pair of pins;
   d) a torsion wire spring within said pipe for forcing each said pin through one said aperture in said pipe and into one said orifice in said flange of said fitting, when said end of said pipe is inserted into said flange of said fitting, so as to retain said pipe to said fitting; and
   e) means for sealing the connection between said pipe and said fitting, so that a fluid can pass between said pipe and said fitting without a leakage therefrom.

2. A quick change PVC pipe connection system as recited in claim 1, wherein said torsion wire spring includes:
   a) a coiled portion;
   b) a pair of arms, in which each said arm extends from one side of said coiled portion; and
   c) means for connecting a distal free end of each said arm to one said pin.

3. A quick change PVC pipe connection system as recited in claim 2, wherein each said connecting means includes:
   a) a rivet extending from a bottom end of said pin; and
   b) said arm having a loop formed on said distal free end, whereby said loop extends about said rivet to hold said pin thereto.

4. A quick change PVC pipe connection system as recited in claim 2, further including means for releasing both of said pins from said orifices in said flange of said fitting, so that said end of said pipe can be removed from said flange of said fitting.

5. A quick change PVC pipe connection system comprising:
   a) a pipe having a pair of opposite spaced apertures extending through one end;
   b) a fitting having a flange with a pair of opposite spaced orifices extending through said flange;
   c) a pair of pins:
   d) a torsion wire spring within said pipe for forcing each said pin through one said aperture in said pipe and into one said orifice in said flange of said fitting, when said end of said pipe is inserted into said flange of said fitting, so as to retain said pipe to said fitting, said torsion wire spring having:

i) a coiled portion
  ii) a pair of arms, in which each said arm extends from one side of said coiled portion; and
  iii) means for connecting a distal free end of each said arm to one said pin; and e) means for releasing both of said pins from said orifices in said flange of said fitting, so that said end of said pipe can be removed from said flange of said fitting, wherein said releasing means includes:

i) each of said pins having a top hole therein; and
  ii) a disassembly tool being a generally V-shaped heavy duty flexible wire having right angle bent ends, whereby when said tool is squeezed said bent ends can engage with said top holes in said pins to push said pins out of said orifices in said flange of said fitting.

6. A quick change PVC pipe connection system as recited in claim 1, wherein said sealing means includes:

a) said fitting having an annular groove formed within said flange; and
  b) an O-ring gasket sized to fit tightly between said annular groove in said flange of said fitting and said end of said pipe to prevent leakage therefrom.

7. A quick change PVC pipe connection system as recited in claim 6, wherein said O-ring gasket is fabricated out of a durable rubber material.

8. A quick change PVC pipe connection system as recited in claim 1, wherein said sealing means includes:

a) each said pin having a circular seat formed thereon; and
  b) a pair of washer gaskets sized to fit tightly onto said pin and up against said aperture in said pipe, to prevent leakage therefrom.

9. A quick change PVC pipe connection system as recited in claim 8, wherein each said washer gasket is fabricated out of a durable rubber material.

10. A quick change PVC pipe connection system as recited in claim 1, wherein said torsion wire spring is fabricated out of a stainless steel material.

11. A quick change PVC pipe connection system comprising:

a) a pipe having a pair of opposite spaced apertures extending through one end;
  b) a fitting having a flange with a pair of opposite spaced orifices extending through said flange;
  c) a pair of pins;
  d) a torsion wire spring within said pipe for forcing each said pin through one said aperture in said pipe and into one said orifice in said flange of said fitting, when said end of said pipe is inserted into said flange of said fitting, so as to retain said pipe to said fitting, said torsion wire spring having:

i) a coiled portion
  ii) a pair of arms, in which each said arm extends from one side of said coiled portion; and
  iii) means for connecting a distal free end of each said arm to one said pin, each said connecting means including: a rivet extending from a bottom end of said pin; and a loop formed on said distal free end of said arm, whereby said loop extends about said rivet to hold said pin thereto; and e) means for releasing both of said pins from said orifices in said flange of said fitting, so that said end of said pipe can be removed from said flange of said fitting, wherein said releasing means includes:

i) each of said pins having a top hole therein; and
  ii) a disassembly tool being a generally V-shaped heavy duty flexible wire having right angle bent ends, whereby when said tool is squeezed said bent ends can engage with said top holes in said pins to push said pins out of said orifices in said flange of said fitting.

12. A quick change PVC pipe connection system as recited in claim 11, further including means for sealing the connection between said pipe and said fitting, so that a fluid can pass between said pipe and said fitting without a leakage therefrom.

13. A quick change PVC pipe connection system as recited in claim 12, wherein said sealing means includes:

a) said fitting having an annular groove formed within said flange; and
  b) an O-ring gasket sized to fit tightly between said annular groove in said flange of said fitting and said end of said pipe to prevent leakage therefrom.

14. A quick change PVC pipe connection system as recited in claim 13, wherein said O-ring gasket is fabricated out of a durable rubber material.

15. A quick change PVC pipe connection system as recited in claim 14, wherein said sealing means includes:

a) each said pin having a circular seat formed thereon; and
  b) a pair of washer gaskets sized to fit tightly onto said pin and up against said aperture in said pipe, to prevent leakage therefrom.

16. A quick change PVC pipe connection system as recited in claim 15, wherein each said washer gasket is fabricated out of a durable rubber material.

17. A quick change PVC pipe connection system as recited in claim 16, wherein said torsion wire spring is fabricated out of a stainless steel material.

* * * * *